United States Patent
Mann et al.

(10) Patent No.: US 8,210,558 B2
(45) Date of Patent: Jul. 3, 2012

(54) FIFTH WHEEL SECONDARY LOCK

(75) Inventors: Steven William Mann, Gardendale, AL (US); James Matthew Rhodes, Pelham, AL (US)

(73) Assignee: Fontaine Fifth Wheel Co., Trussville, AL (US)

( * ) Notice: Subject to any disclaimer, the term of this patent is extended or adjusted under 35 U.S.C. 154(b) by 274 days.

(21) Appl. No.: 12/628,508

(22) Filed: Dec. 1, 2009

(65) Prior Publication Data

US 2011/0127750 A1    Jun. 2, 2011

(51) Int. Cl.
  *B62D 53/06*    (2006.01)
(52) U.S. Cl. ............... 280/437; 280/436; 280/433
(58) Field of Classification Search .......... 280/437, 280/436, 433
  See application file for complete search history.

(56) References Cited

U.S. PATENT DOCUMENTS

| 5,876,055 | A | * | 3/1999 | Fontaine | 280/437 |
| 6,095,544 | A | | 8/2000 | Flater | |
| 6,352,277 | B1 | | 3/2002 | Timmings | |
| 6,520,527 | B2 | * | 2/2003 | Laarman | 280/437 |
| 7,735,849 | B1 | | 6/2010 | Mann | |
| 7,770,910 | B1 | * | 8/2010 | Shirk, Jr. | 280/433 |

FOREIGN PATENT DOCUMENTS

WO    WO 2010/132798    11/2010

* cited by examiner

*Primary Examiner* — Lesley D. Morris
*Assistant Examiner* — Marlon Arce
(74) *Attorney, Agent, or Firm* — George P. Kobler; Lanier Ford Shaver & Payne PC

(57) ABSTRACT

A secondary lock assembly for a fifth wheel, where the fifth wheel includes a hitch plate with a rearward opening slot to receive a trailer kingpin and a transversely sliding primary locking member for retaining the kingpin within the slot. The assembly comprises a tie bar pivotally connected at its middle to the primary locking member and a transversely oriented pull bar pivotally connected at an inner end to the forward end of the tie bar. The pull bar comprises a rearward offset tab. A latch is pivotally connected roughly at the center of the latch to the forward end of the tie bar, and also pivotally connected at a point rearwardly and inwardly offset from the first pivoting connection to the offset tab. A detent extends from a transverse wall comprised in said hitch plate such that said detent lies in the same horizontal plane as said latch.

15 Claims, 7 Drawing Sheets

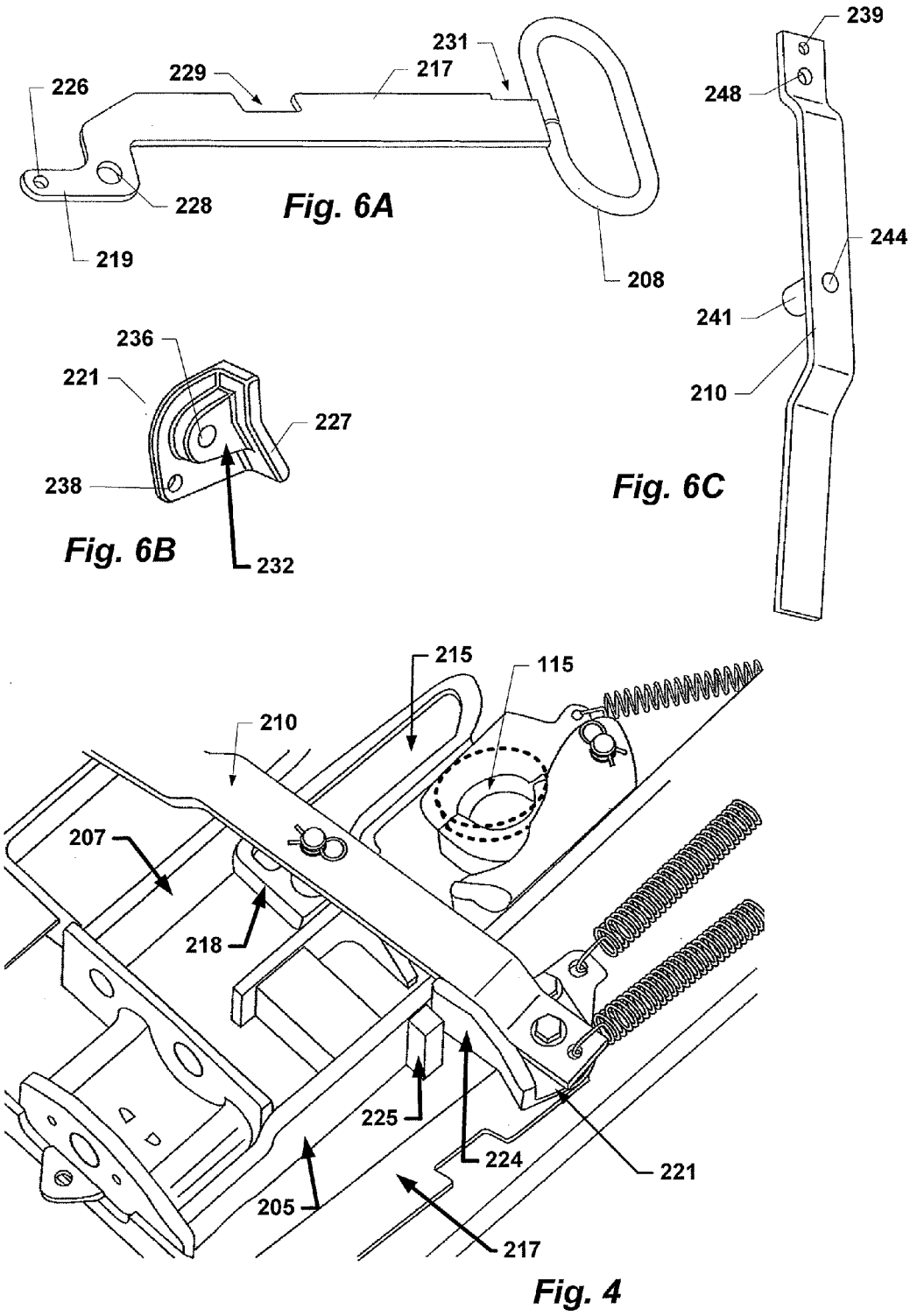

FIFTH WHEEL SECONDARY LOCK

BACKGROUND

1. Field

The present invention relates to a secondary lock assembly for a fifth wheel hitch.

2. Background Art

Fifth wheel hitches are well known in the field of towing trailers using a truck or tractor. FIGS. 1A through 1C depict an exemplary tractor and trailer hitch arrangement employing a fifth wheel hitch. Tractor 100 is affixed with a fifth wheel hitch 103 to rear of tractor frame 105. Fifth wheel hitch 103 includes a fifth wheel hitch assembly 10 pivotally mounted on mounting brackets 185 by means of a mounting pin 187 inserted through corresponding bores through the hitch plate 30 and the bracket 185. The underside of the fifth wheel hitch assembly 10 includes a bearing 188 which rests upon the curved top of the bracket 185. Fifth wheel hitch assembly 10 comprises hitch plate 30 which houses a locking mechanism underneath with slot 135 opening toward the aft end of fifth wheel assembly 10 for receiving a kingpin 111 from trailer 119 and terminating toward the forward side in a u-shaped throat area 21.

Kingpin 111 typically extends from a trailer bearing plate 107, which rests upon fifth wheel assembly 10, specifically, upon load area 145 of fifth wheel hitch plate 30. Kingpin is, typically, a unitarily constructed article comprised of a lower flange 115 capping a shank 113 which extends from collar 117.

One known form of fifth wheel coupling is disclosed in U.S. Pat. No. 6,352,277 in which a hitch plate provided with a slot for reception of a shank portion of a king-pin of a trailer, a pivotally mounted jaw member for holding the king-pin in the slot and a locking wedge for locking the jaw member in its closed position. The jaw member includes a forward arm extending in a different (lower) plane to a hook. The arm, in use, is contacted by the lower flange of a correctly aligned king-pin, and causes the jaw member to pivot so that the hook engages the shank of the king-pin. This assembly is tied to a pull bar through a pivotal connection to the locking wedge with a tie bar.

BRIEF DESCRIPTION OF THE DRAWINGS

The present invention is described with reference to the accompanying drawings. In the drawings, like reference numbers indicate identical or functionally similar elements.

FIG. 4 is a detailed perspective view of lock mechanism and the exemplary secondary lock assembly;

FIG. 6A illustrates an exemplary hitch pull bar;

FIG. 6B illustrates an exemplary latch;

FIG. 6C illustrates and exemplary tie bar;

DETAILED DESCRIPTION

Figure 1A:
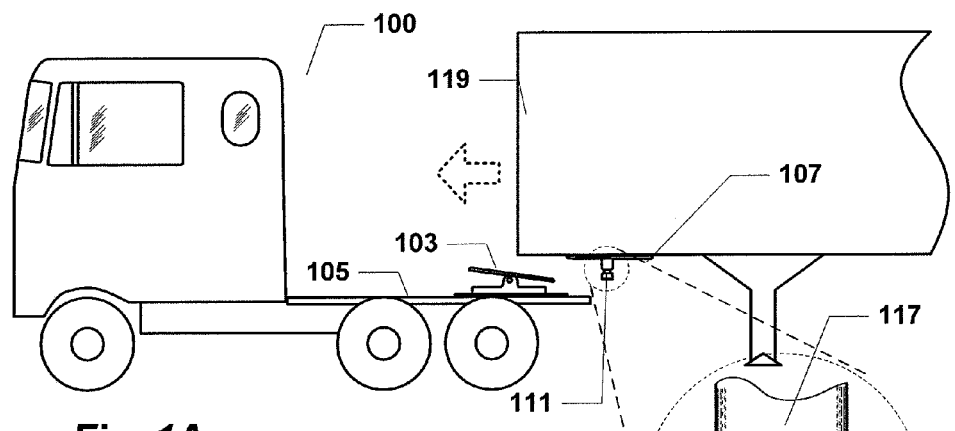
FIG. 1A is an exemplary tractor truck and trailer with a fifth wheel hitch.
Figure 1B:
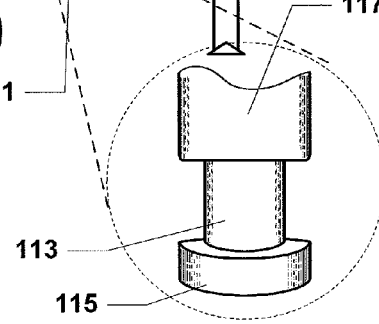
FIG. 1B is an exemplary fifth wheel hitch.
Figure 1C:
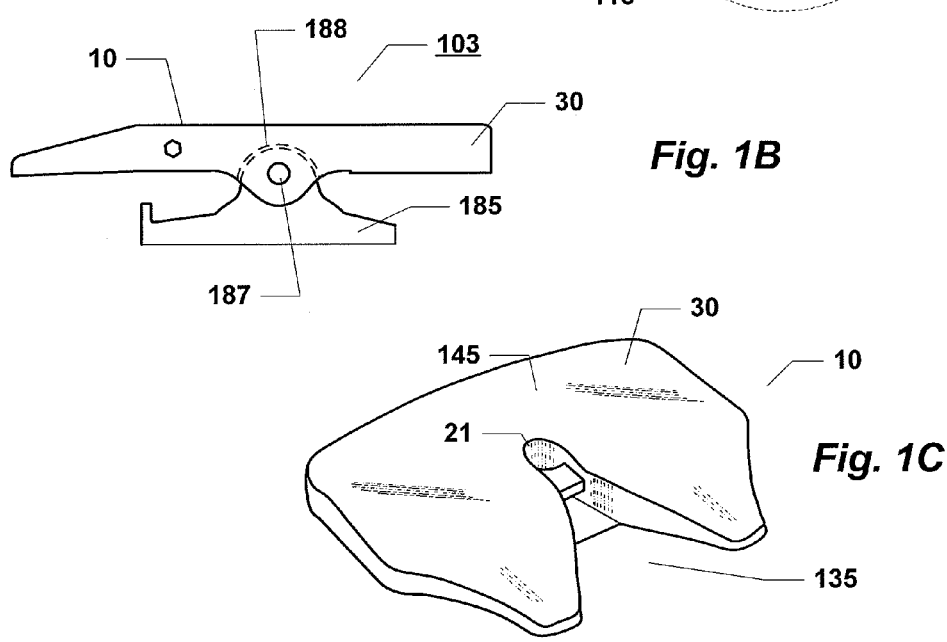
FIG. 1C is a hitch plate.

The various embodiments of the present invention and their advantages are best understood by referring to FIGS. 1 through 8B of the drawings. The elements of the drawings are not necessarily to scale, emphasis instead being placed upon clearly illustrating the principles of the invention. Throughout the drawings, like numerals are used for like and corresponding parts of the various drawings.

The drawings represent and illustrate examples of the various embodiments of the invention, and not a limitation thereof. It will be apparent to those skilled in the art that various modifications and variations can be made in the present inventions without departing from the scope and spirit of the invention as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present invention covers such modifications as come within the scope of the features and their equivalents.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Terms such as "aft," "rear," "forward," "front," "lateral," "longitudinal," "transverse," or "outward," or the like, and derivatives thereof are to be understand in relation to the truck or vehicle on which the fifth wheel is mounted. On the other hand, rotational terms such as "clockwise" and "counter-clockwise" are to be understood as viewed in the figure(s) referenced in the detailed description. However, it is to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

FIGS. 2 through 8 depict different aspects and positions the underside of a hitch plate assembly referenced generally at 10, configured with a primary lock mechanism, generally at 20, shown in the closed, or locked position. The longitudinal axis of the hitch assembly is indicated at 22 and is congruent with the longitudinal axis of the truck upon which the fifth wheel is installed. The transverse axis is shown at 24. The hitch assembly rearward end 26 includes a slot 135 to receive a trailer kingpin 111 and that opens to the rear of the truck. The hitch plate includes a u-shaped throat area 21 that is dimensioned to receive the kingpin shank portion 113. The underside of the plate also preferably comprises a support ridge 201 located about the periphery of the forward edge of the u-shaped throat 21 and having a rearward end. The ridge 201 comprises a substantially vertical arcuate wall that extends downward from the hitch plate 30 underside a sufficient distance such that the vertical wall is in full contact with the kingpin 111 shank 113. A frame comprised of one or more transverse walls 205, 207, also extend downward from the hitch plate 30 underside on which many of the components of the lock mechanism are mounted.

Figure 2:
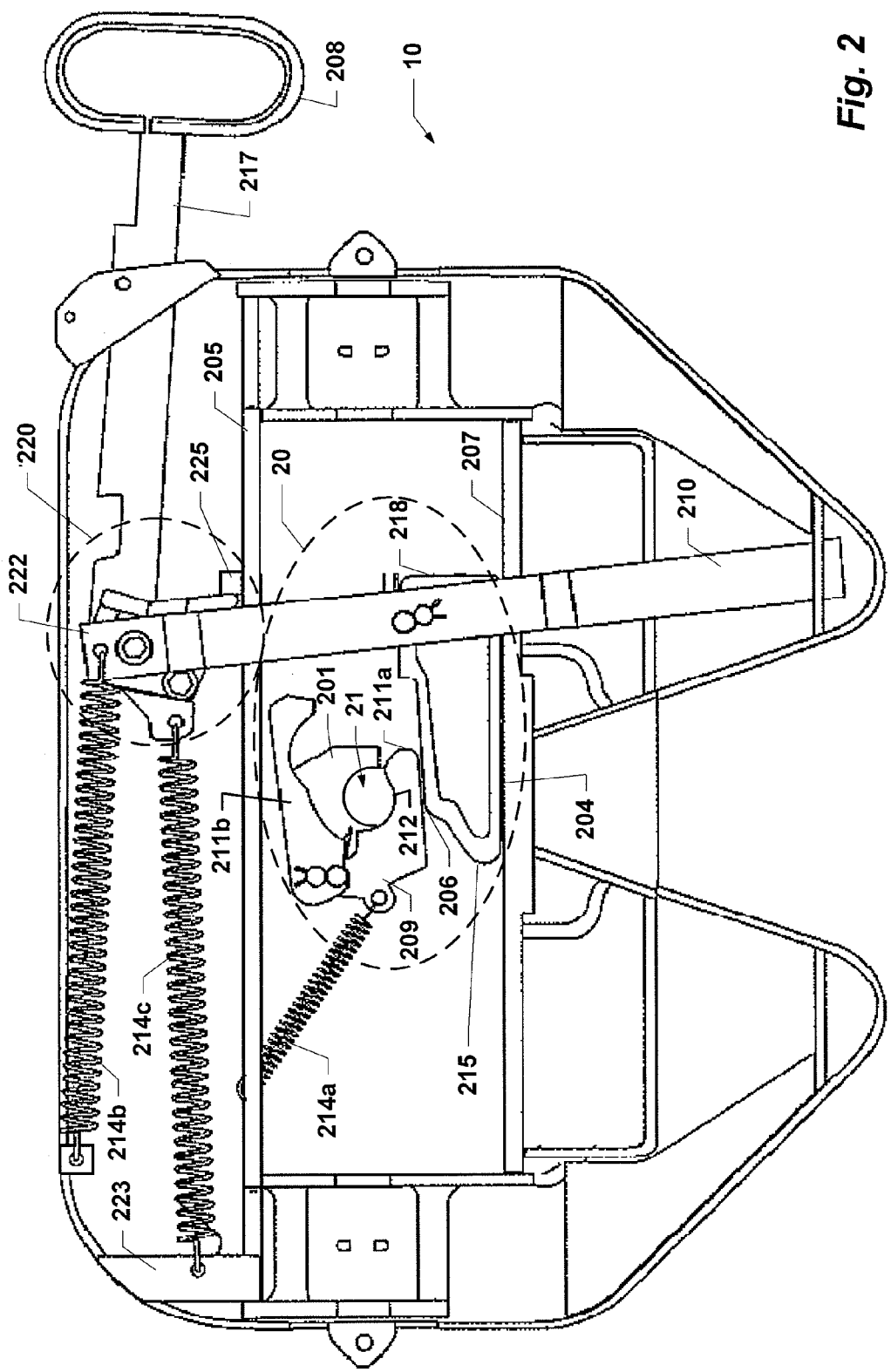
FIG. 2 is a plan view of the underside of an exemplary hitch plate according to an embodiment of the invention.
Figures 3A, 3B:
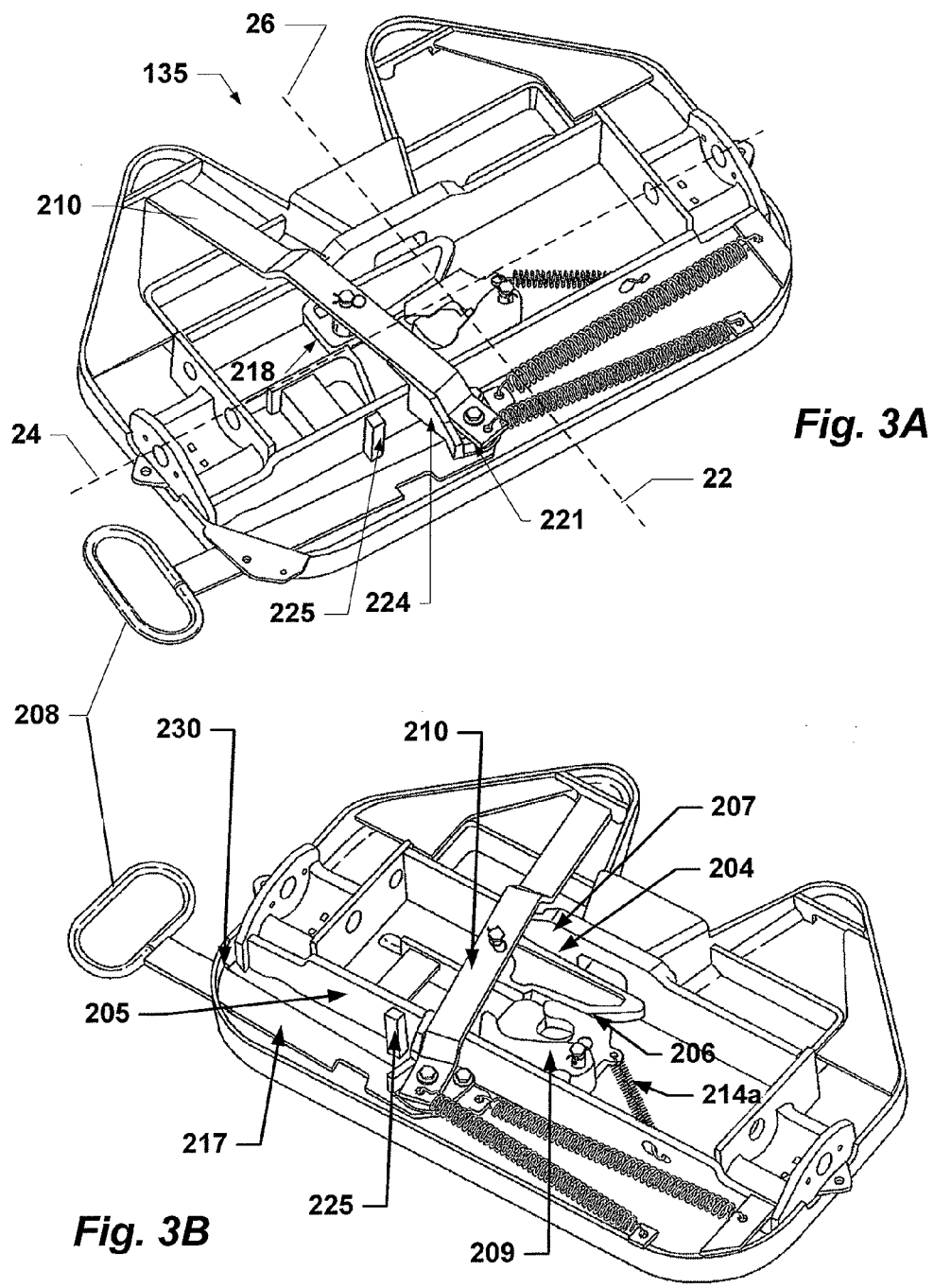
FIGS. 3A & 3B are another perspective views of the underside of the hitch plate of FIG. 2.

The primary lock mechanism 20 comprises a one-piece jaw member 209 pivotally connected to the underside adjacent a forward quarter of the throat area 21 having a rear arm 211a and a forward arm 211b. The two arms 211a, 211b, include opposing cut-out portions dimensioned to receive the king pin shank portion. The rear arm 211a comprises a hook with a central generally arcuate cut-out 212, and is mounted such that it is co-planar with the ridge 201. FIGS. 2 through 4 illustrate the lock in the closed, or locked, position with the rear arm 211a of the jaw member 209 extending across the u-shaped throat area 21. The forward side of the end of the rear arm 211a meets the rear end 201a of the ridge 201. It can be seen the cut-out 212 mates with the end of the u-shaped throat area 21, forming a circular opening within which the kingpin shank 113 is retained (shown in dashed outline in FIGS. 4 and 5). The forward arm 211b acts as a sensor arm, and is disposed in a lower horizontal plane than the rear arm 211a so that it is co-planar with the lower flange 115 of the kingpin 113.

A first tension member 214a is connected at one end to outward side of the jaw member 209, and at the other end to the forward transverse wall 205. A locking wedge 215 is interposed between the rear arm 211a of the jaw member 209 and the rear transverse wall 207. The locking wedge 215 has parallel edge 204 seated against the forward side of the rear wall 207 and an opposing edge 206 tapering toward the interior of the hitch to a rounded inward end. The tapered edge 206 is slidably engaged with the rear edge of the rear arm 211a.

A pull bar 217 extends transversely through an aperture 230 defined in a lateral wall of the hitch plate 30 and is configured with a pull handle 208 on an exterior free end, and an attached end within the interior of the plate. The pull bar 217 is also configured with a rearwardly offset tab 219 (shown in detail in FIG. 6A). The primary lock mechanism 20 also includes a tie bar 210 oriented generally longitudinally having a free end disposed toward the rearward side of the hitch plate 30. The mid portion of the tie bar 210 is pivotally connected to the lateral outward end 218 of the locking wedge 215.

A secondary lock assembly 220 comprises a latch 221 pivotally connected by an inward rear corner to the offset tab 219 of the pull bar 217, and pivotally connected at its forward center to the forward end 222 of the tie bar 210. The outward side of the latch 224 is configured with a rim 227 that extends downward from the underside of the latch 221 and is angled with the forward portion generally parallel to the latch's inward edge, and the rearward portion tending outward. A detent 225 extends forward from the forward transverse wall 205, and lies in plane with the latch 221. A second tension member 214b is connected by an inward end to the forward end 222 of the tie bar 210 and by an outer end, toward the side opposite the pull bar 217, to a forward portion of the hitch plate 30. Similarly, a third tension member 214c is connected by an inward end to inward end of the pull bar 217, and by an outer end, again toward the side opposite the pull bar 217 to a support rib 223. Referring to FIG. 6A which illustrates the pull bar 217 by itself, it can be seen the that, preferably, the inward attached end of the pull bar 217 comprises rearwardly offset tab 219 with one aperture 226 defined in the end, allowing for connecting the inward end of the third tension member 214c. Preferably, the pull bar 217 is also formed with a notch 229 midway along the forward edge and a second notch 231 in the forward edge adjacent the handle 208. A second aperture 228 is defined in the pull bar 217 near a corner 227 created by the offset tab 219 which receives a pin (or bolt) to achieve the pivoting connection between the latch 221 and the pull bar 217.

FIG. 6B shows the latch 221 in isolation where it can be seen that the latch 221 is formed with two apertures to accommodate the pivotal connections described above. Specifically, a central aperture 236 allows connection between the latch 221 and tie bar 210. Likewise, a second aperture 238 is formed in the rearward inner corner for the connected with the second aperture 228 of the pull bar 217. It will be noted that the latch 221 may also include a boss 232 surrounding the central aperture 236. This provides spacing between the tie bar 210 and the pull bar 217 ends.

The tie bar 210, shown in detail in FIG. 6C, is formed with a forward aperture 239 to provide a connection point for the second tension member 214b, and a second aperture 248, located rearward of the forward aperture 239, to provide pivotal connection of the tie bar 210 to the latch 221 at its central aperture 236. In this embodiment, tie bar 210 is configured with a double curve form and including a boss 241 having a bore therethrough 244 to permit pivotal connection of the tie bar 210 to the locking wedge 215. The locking wedge 215 may be configured with an aperture in its lateral outward end 218 to receive the boss 241. Accordingly, such a boss 241 may provide added support against shearing forces transmitted through the locking wedge 215. The double curve shape is used in this exemplary apparatus to fit the tie bar 210 under the transverse support walls 205, 207, but still maintain as thin a profile as possible.

Figure 7:
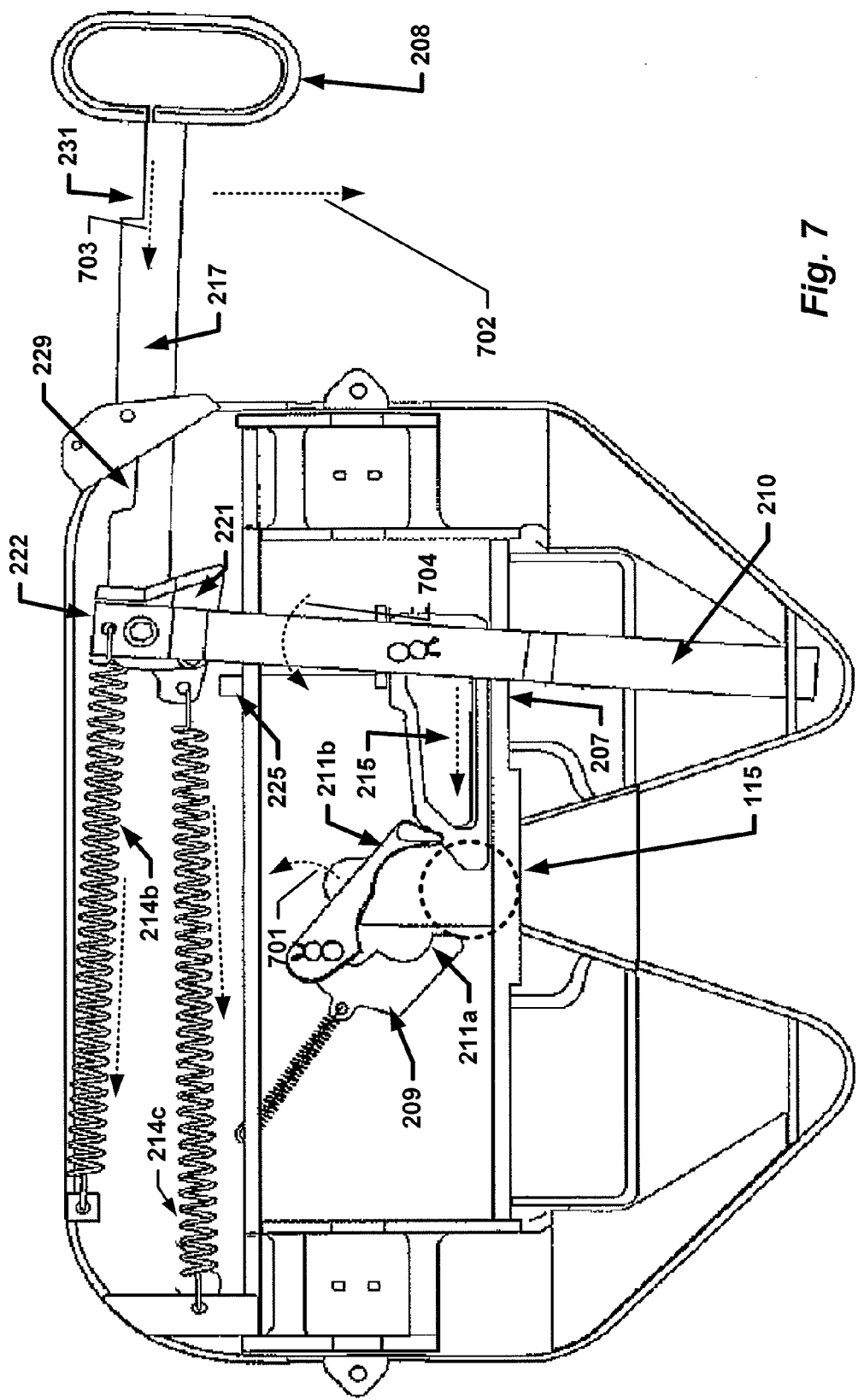
FIG. 7 is a plan view of the exemplary hitch plate, in the open position.

Cooperation of the elements described above may be understood beginning with the lock mechanism in the open position, shown in FIG. 7, where rear arm 211a is rotated laterally from the throat area 21 through tension applied by first tension member 214a. Jaw member 209 is rotated rearward so that front arm 211b lies across the throat area. The end of the forward jaw member 211b rests on the free end of the locking wedge 215, which is displaced laterally away from the throat area 21 as well. Pull bar 217 is also displaced laterally, thus, positioning the latch 221 on the outer side of the detent 225.

When a trailer is to be coupled to a tractor on which the fifth wheel assembly is mounted, the tractor is driven in reverse so that the trailer kingpin 111 (FIG. 1) is accepted in the slot and moves into the throat area 21. The height of the trailer and thus the kingpin is such that the shank portion is received with the throat area 21, and the kingpin lower flange 115 (shown in dashed outline in FIG. 7) is roughly level with the forward arm 211b. As the kingpin is received into the throat area 21, the kingpin lower flange 115 contacts the forward arm 211b and pushes it forward which causes the jaw member 209 to rotate in the direction indicated by reference arrow 701, as the kingpin shank 113 is received between to two arms 211a, 211b until the rear arm 211a lies across the throat area and the arcuate cutout 212 is seated snugly against the rearward portion of the kingpin shank 113. The kingpin shank 113 is also seated against the forward wall 203 and ridge 201 surrounding the u-shaped throat area 21.

At the same time, second and third tension members 214b, 214c exert tension forces on the forward end 222 of the tie bar 210 and the pull bar 217, respectively (indicated by the associated reference arrows), to bias this assembly laterally inward. However, the pull bar 217 is maintained in an outward, open position by engagement of the notch 229 in the edge of the pull bar with the edge of the aperture 230 in the wall of the hitch plate through which the pull bar 217 extends. The rim 227 on the forward portion of the latch 221 limits rotation of the latch 221.

The locking mechanism is engaged by adjusting rearward (reference arrow 702) the pull bar 217 to move the notch 229 free from the aperture 230, allowing the second and third tension members 214b, 214c to pull the pull bar 217 inward (703) and rotate the forward end 222 of the tie bar 210 inward as well (704). Because the tie bar 210 is pivotally connected to the locking wedge 215, this inward rotation causes the wedge 215 to slide inward as well until in is seated between the rear transverse wall 207 and the rear arm 211a of the jaw member 209.

The latch 221 is also drawn to the inward side of the detent 225 and allowed to rotate so that its rearward end is in line with the detent 225, and the rear portion of the rim 227 abuts the outer edge of the tie bar 210. It can be seen in this arrangement, the latch 221 prevents the tie bar 210 from rotating outward, and, therefore, it prevents the locking wedge 215 from sliding outward. Thus, the locking wedge 215 and the jaw member 209 remain securely in the closed position. The lock may be further secured by the engagement of the second notch 231 in the pull bar 217 against the wall of the aperture 230.

Figure 5:
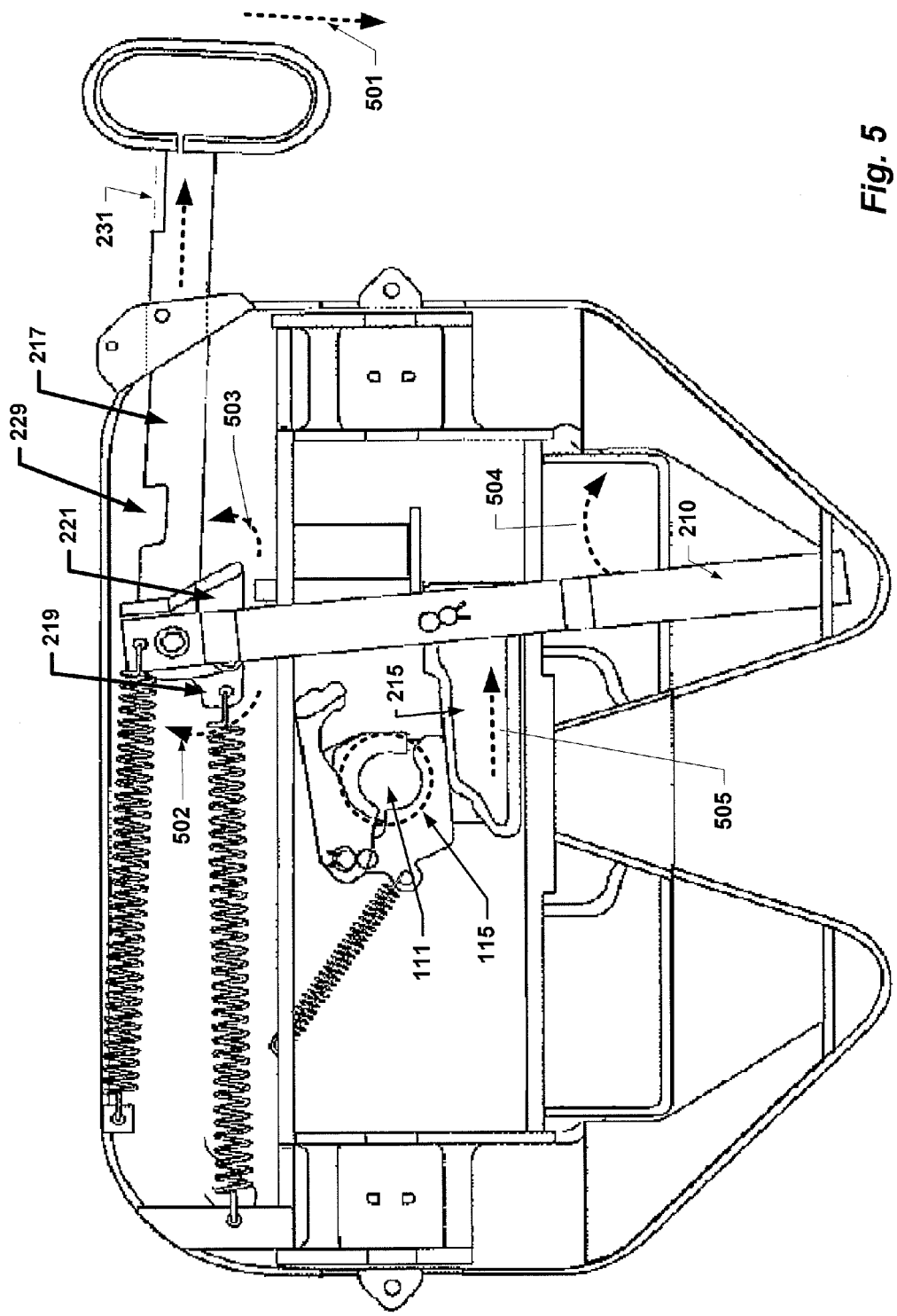
FIG. 5 is a plan view of an exemplary hitch plate underside illustrating opening of the lock and secondary lock mechanisms.

With reference to FIG. 5, opening the lock begins with the operator manually moving the pull bar slightly rearward (indicated by reference arrow 501). This motion causes the inward end of the pull bar 217 to rotate forward (arrow 502). As a result of this movement and the two spaced-apart pivoting connections, namely, those of the pull bar 217 to the latch 221, and the latch to the tie bar 210, the latch rotates counter-clockwise (arrow 503) allowing the latch 221 to clear the detent 225, after which the pull bar 217 may be drawn outward. Once the latch 221 is clear of the detent 225, the pull bar 217 may be fully drawn out, rotating the tie bar 210 laterally outward (504) thus, also sliding the locking wedge 215 outward as well (505), and allowing the jaw member to rotate to the open position. This frees the kingpin and the tractor may be advanced to move the fifth wheel away from the trailer.

Figure 8A:
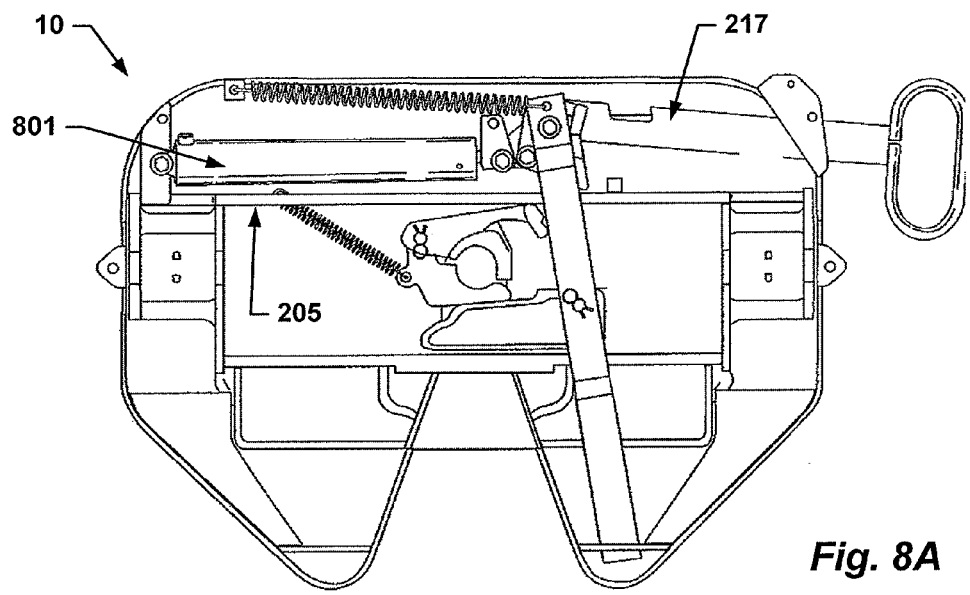
FIGS. 8A & B are plan views of the underside an exemplary hitch plate according to a further embodiment.
Figure 8B:
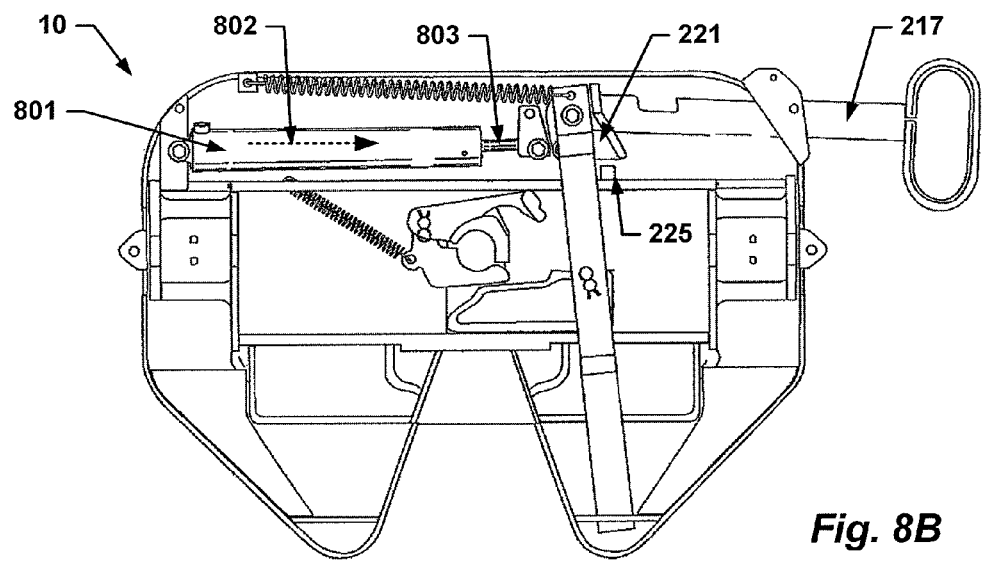

Another variation is shown in FIGS. 8A, and 8B where the hitch plate assembly 10 comprises the arrangement shown and described above, with the addition of a pneumatic cylinder 801 located forward of the forward transverse wall 205 having a piston 803 pivotally connected to the inward end of the pull bar 217 and configured for lateral actuation. Operation of this embodiment is similar to that of the previously described embodiments except that the pneumatic cylinder assists in opening the lock by exerting force (indicated by reference 802 in the figure) on the inward end of the pull bar 217, rotating it rearward enough to allow the latch 221 to rotate clear of the detent 225.

As described above and shown in the associated drawings, the present invention comprises a fifth wheel secondary lock. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A secondary lock assembly for a fifth wheel, said fifth wheel including a hitch plate having a front and a rear corresponding to a vehicle on which the fifth wheel is installed, configured with a rearward opening slot to receive a trailer kingpin and a transversely sliding primary locking member for retaining the kingpin within the slot, and having a transverse support wall disposed forward of the locking member, said assembly comprising:
   a generally longitudinally oriented elongated tie bar pivotally connected at its middle to said primary locking member, and having a forward end;
   a transversely oriented bar member, having an outer end and an inner end, pivotally connected at an inner end to said forward end of said tie bar, said transversely oriented bar comprising a rearward offset tab;
   a latch having a first pivoting connection roughly at said latch's center to the forward end of the tie bar, and a second pivoting connection rearwardly and inwardly offset from said first pivoting connection to said offset tab; and
   a detent extending forward from said forward transverse wall such that said detent lies in the same horizontal plane as said latch such that said latch is engaged by said detent to prevent movement of said tie bar.

2. The secondary lock assembly of claim 1, wherein said latch further comprises an outward edge having a rim extending through a plane in which said forward end of said tie bar lies.

3. The secondary lock assembly of claim 2, wherein said outward edge is configured with an obtuse angle.

4. The secondary lock assembly of claim 1, wherein said transversely oriented bar outer end extends through an opening in a downward extending wall of said hitch plate.

5. The secondary lock assembly of claim 4, wherein said transversely oriented bar further comprises a notch.

6. The secondary lock assembly of claim 4, further comprising a pull handle located at said outer end of said transversely oriented bar.

7. The secondary lock assembly of claim 6, wherein said latch further comprises an outward edge having a rim extending through a plane in which said forward end of said tie bar lies.

8. The secondary lock assembly of claim 7, wherein said outward edge is configured with an obtuse angle.

9. The secondary lock assembly of claim 8, wherein said transversely oriented bar further comprises a notch.

10. The secondary lock assembly of claim 1, further comprising a transversely operable pneumatic actuator connected to said inner end of said transversely oriented bar.

11. The secondary lock assembly of claim 10, wherein said latch further comprises an outward edge having a rim extending through a plane in which said forward end of said tie bar lies.

12. The secondary lock assembly of claim 11, wherein said outward edge is configured with an obtuse angle.

13. The secondary lock assembly of claim 10, wherein said transversely oriented bar outer end extends through an opening in a downward extending wall of said hitch plate.

14. The secondary lock assembly of claim 13, wherein said transversely oriented bar further comprises a notch.

15. The secondary lock assembly of claim 14, further comprising a pull handle located at said outer end of said transversely oriented bar.

* * * * *